US012673649B2

(12) United States Patent
Brok et al.

(10) Patent No.: US 12,673,649 B2
(45) Date of Patent: Jul. 7, 2026

(54) BRAKING SYSTEM OF A VEHICLE

(71) Applicant: AUDI AG, Ingolstadt (DE)

(72) Inventors: Tobias Brok, Kösching (DE); Kilian Förster, Beilngries (DE); Werner Schneider, Ingolstadt (DE); Christopher Wolfram, Wurzbach (DE)

(73) Assignee: AUDI AG, Ingolstadt (DE)

( * ) Notice: Subject to any disclaimer, the term of this patent is extended or adjusted under 35 U.S.C. 154(b) by 693 days.

(21) Appl. No.: 18/298,563

(22) Filed: Apr. 11, 2023

(65) Prior Publication Data

US 2023/0339445 A1 Oct. 26, 2023

(30) Foreign Application Priority Data

Apr. 26, 2022 (DE) .......................... 102022109991.1

(51) Int. Cl.
*B60T 13/66* (2006.01)
*B60T 7/04* (2006.01)
*B60T 8/1755* (2006.01)
*B60T 8/40* (2006.01)

(52) U.S. Cl.
CPC ............ *B60T 13/662* (2013.01); *B60T 7/042* (2013.01); *B60T 8/1755* (2013.01); *B60T 8/40* (2013.01); *B60T 2270/402* (2013.01)

(58) Field of Classification Search
CPC .......... B60T 7/042; B60T 8/1755; B60T 8/40; B60T 2270/406
See application file for complete search history.

(56) References Cited

U.S. PATENT DOCUMENTS 5,212,640 A * 5/1993 Matsuda ............ B60G 17/0185
701/29.2
5,381,692 A * 1/1995 Winslow ............... F16C 19/527
340/682
(Continued)

FOREIGN PATENT DOCUMENTS

CN 110603178 A 12/2019
CN 112918417 A 6/2021
(Continued)

OTHER PUBLICATIONS

Extended Search Report issued on Sep. 26, 2023, in corresponding European Application No. 23164745.4, 14 pages.
(Continued)

*Primary Examiner* — Nicholas J Lane
(74) *Attorney, Agent, or Firm* — Maier & Maier, PLLC

(57) ABSTRACT

A braking system of a vehicle, with at least one brake control system with a brake pressure regulator which, in case of a braking request, builds up a hydraulic brake pressure by which the vehicle wheel brakes can be actuated. The brake control system is attached to the vehicle body via a holder. For the detection of a holder failure, an evaluation unit is provided, which acquires a sensor signal curve from an internal sensor built into the brake control system. In the evaluation unit, a signal comparison occurs. The acquired sensor signal curve is compared to a reference signal curve. In case of a significant deviation of the acquired sensor signal curve from the reference signal curve, the evaluation unit generates a holder damage signal.

19 Claims, 6 Drawing Sheets

(56)         References Cited

U.S. PATENT DOCUMENTS

| | | | | |
|---|---|---|---|---|
| 2007/0164853 | A1* | 7/2007 | Matsuda | B60T 8/1725 |
| | | | | 702/141 |
| 2012/0091282 | A1* | 4/2012 | Spiller | B64D 45/0005 |
| | | | | 701/33.9 |
| 2018/0245573 | A1* | 8/2018 | Maruo | B60T 13/662 |
| 2022/0146456 | A1* | 5/2022 | Brandon | H04R 1/406 |

FOREIGN PATENT DOCUMENTS

| | | | |
|---|---|---|---|
| DE | 1010330145 | A1 | 9/2004 |
| DE | 102004021648 | A1 | 12/2005 |
| DE | 102006051261 | A1 | 11/2007 |
| DE | 102010038971 | A1 | 2/2012 |
| DE | 102018222313 | A | 6/2020 |
| DE | 102020206436 | A1 | 11/2021 |

OTHER PUBLICATIONS

Search Report issued on Jan. 9, 2023, in corresponding German Application No. 102022109991.1, 8 pages.
Office Action issued on Feb. 4, 2026, in corresponding Chinese Application No. 202310440073.1, 11 pages.

* cited by examiner

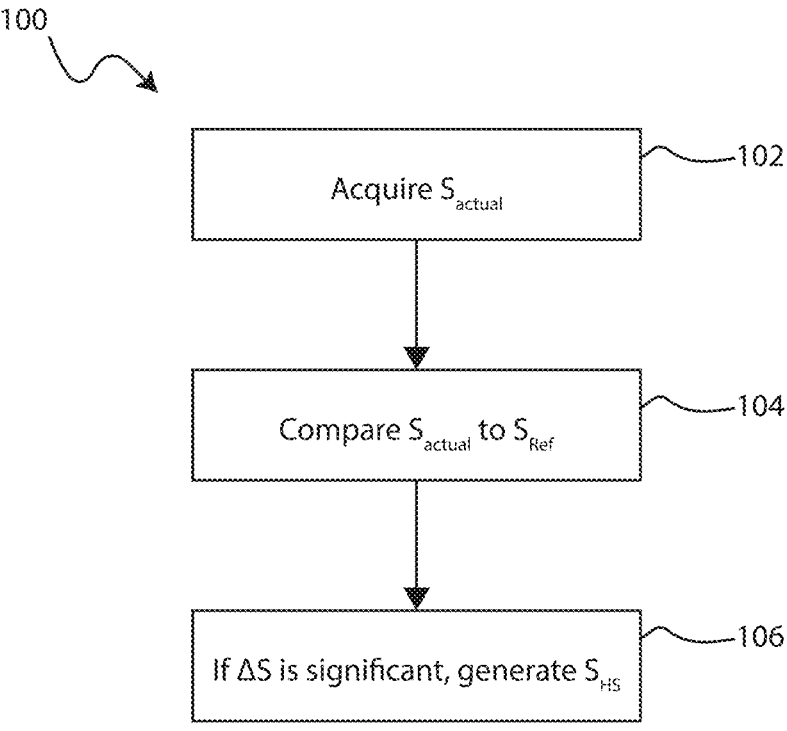
_Fig. 6_

BRAKING SYSTEM OF A VEHICLE

FIELD

The invention relates to a braking system of a vehicle and to a method for detecting a holder failure in such a braking system.

BACKGROUND

The braking system of a vehicle can be implemented as a brake-by-wire system, wherein the brake pedal is not in mechanical connection but only in electric signal connection with a brake control system. The brake control system builds up a hydraulic brake pressure by means of which the vehicle brakes can be actuated in case of a braking request (by the driver or by an electronic stability control).

Such a braking system can comprise two brake control systems in order to provide a backup, namely a primary brake control system and a secondary brake control system. In case of an incorrect operation of the primary brake control system, the secondary brake control system assumes the function of the primary brake control system. The two brake control systems can be attached to the vehicle body by means of a common holder with a view to smallest possible installation space requirement and component reduction.

For safety reasons, the simultaneous occurrence of a combined failure of both brake control systems must be prevented. Such a combined failure would be present if the holder provided for the two brake control systems breaks and as a result, after some time, the hydraulic connections rupture or spring a leak.

From DE 10 2010 038 971 A1, a device for evaluating a state of a chassis of a vehicle is known. From DE 10 2006 051 261 A1, a method in an electronic brake control system is known. From DE 10 2020 206 436 A1, a method for communication between two hydraulic brake control systems in a braking system is known.

SUMMARY

The aim of the invention consists in providing a braking system in which a simple detection of damage to a holder by which at least one brake control system is attached to the vehicle body is enabled.

The invention starts with a braking system which comprises at least one brake control system with a brake pressure regulator. In case of a braking request, said brake pressure regulator builds up a hydraulic brake pressure by means of which the vehicle wheel brakes can be actuated. The brake control system is attached to the vehicle body via a holder. According to the characterizing part of claim 1, a failure of the holder, for example, due to breaking or due to a loosened screw connection between the holder and the vehicle body, can be simply detected by the following measure: Thus, associated with the braking system is an evaluation unit which acquires a sensor signal curve from an internal sensor built into the brake control system. The evaluation unit comprises a comparator component in which a signal comparison occurs, during which the acquired signal curve is compared to a reference signal curve. In case of a significant deviation of the acquired sensor signal curve from the reference signal curve, the evaluation unit generates a holder damage signal. Thereby, the client or the factory can be informed, for example, on the basis of a warning light or a notification text or an entry in the service memory or the like, so that the damage can be remedied.

The comparison of the acquired sensor signal curve to the reference signal curve can be implemented by a comparison of internal and external sensor curves. Alternatively, a temporal comparison of the internal sensor (low amplitude before breaking, high amplitude after breaking) can occur. In another alternative, a comparison of sensor values in the two brake control systems can be based on vibration modes (for example, identical vibration before breaking, thereafter opposite-direction vibrations, amplitude and so on). The above comparisons can also be used in conventional ESC systems. They likewise are not coupled to the pedlary but have a holder which can break.

In the brake control system, in common practice, different internal sensors are built in, the main function of which consists in monitoring the operating mode of the brake control system. For example, such an internal sensor can be a filling level sensor of a hydraulic fluid container of the brake control system. Alternatively and/or additionally, the internal sensor can be an acceleration sensor, on the basis of which an electronic stability control actuates the brake control system in order to perform vehicle dynamic braking engagements. According to the invention, such a brake-control-system-internal sensor in dual function can also be used in case of the detection of a holder failure.

It should be emphasized that the invention is not limited to a holder which supports both a primary brake control system and a secondary brake control system, as presented in the introduction of the description but is instead also applicable to a holder which supports only a single brake control system.

In a particularly preferable embodiment, the braking system can be implemented as a brake-by-wire system which provides both a primary brake control system and a secondary brake control system. In case of an incorrect operation of the primary brake control system, the secondary brake control system assumes the function of the primary brake control system. Preferably, the two brake control systems together are attached to the holder.

With a view to a reliable evaluation of the sensor signal curve generated by the internal sensor, the following measure is preferable: Thus, the evaluation unit can additionally be in signal connection with an external sensor, preferably an acceleration sensor, which is not built into the brake control system. Said external sensor can generate a vibration signal on the basis of vehicle speeds during driving operation. By means of the external sensor, a calibration of the sensor signal curve generated by the internal sensor can be carried out. For example, before the performance of the signal comparison in the evaluation unit, the vehicle vibration signal can be subtracted from the sensor signal curve of the internal sensor. This occurs with formation of a modified sensor signal curve. The modified sensor signal curve is therefore cleaned of a vibration component resulting from the vehicle vibrations. In this case, the signal comparison in the evaluation unit can be performed with the modified sensor signal curve.

Alternatively and/or additionally, the evaluation unit can then check for the presence of holder failure only if the vehicle vibration acquired by the external sensor is below a limit value. In this way, an incorrect generation of a holder damage signal due to excessively high vehicle vibration can be prevented, for example, in case of particularly rough road. Otherwise in this case, there would be a risk that the sensor signal curve acquired by the internal sensor, due to the high vehicle vibration component, is no longer informative with regard to holder damage. In addition, the evaluation unit can also take into consideration a control situation, for example, ABS braking. Here, vibrations of the device after holder breaking are clearly distinguished from those before the breaking.

As mentioned above, in the comparator component of the evaluation unit, the signal comparison occurs between the sensor signal curve acquired by the internal sensor and a reference signal curve. According to an embodiment variant, the reference signal curve can be a signal curve of the internal sensor which appears during normal driving operation as well as in case of intact holder. The reference signal curve can be stored as target value in the evaluation unit.

In an additional embodiment variant, both in the primary brake control system and in the secondary brake control system, a respective internal sensor can be built in. Both internal sensors can be integrated in the detection of a holder failure. In this case, the sensor signal curves of the two internal sensors can be compared to one another in the evaluation unit. Thus, the sensor signal curve of one sensor signal curve forms the reference signal curve for the sensor signal curve of the other sensor signal curve.

BRIEF DESCRIPTION OF THE FIGURES

Below, embodiment examples of the invention are described in reference to the attached figures.

FIG. 6 shows an exemplary embodiment of a method for detecting a holder failure in a braking system.

DETAILED DESCRIPTION

Figure 1:
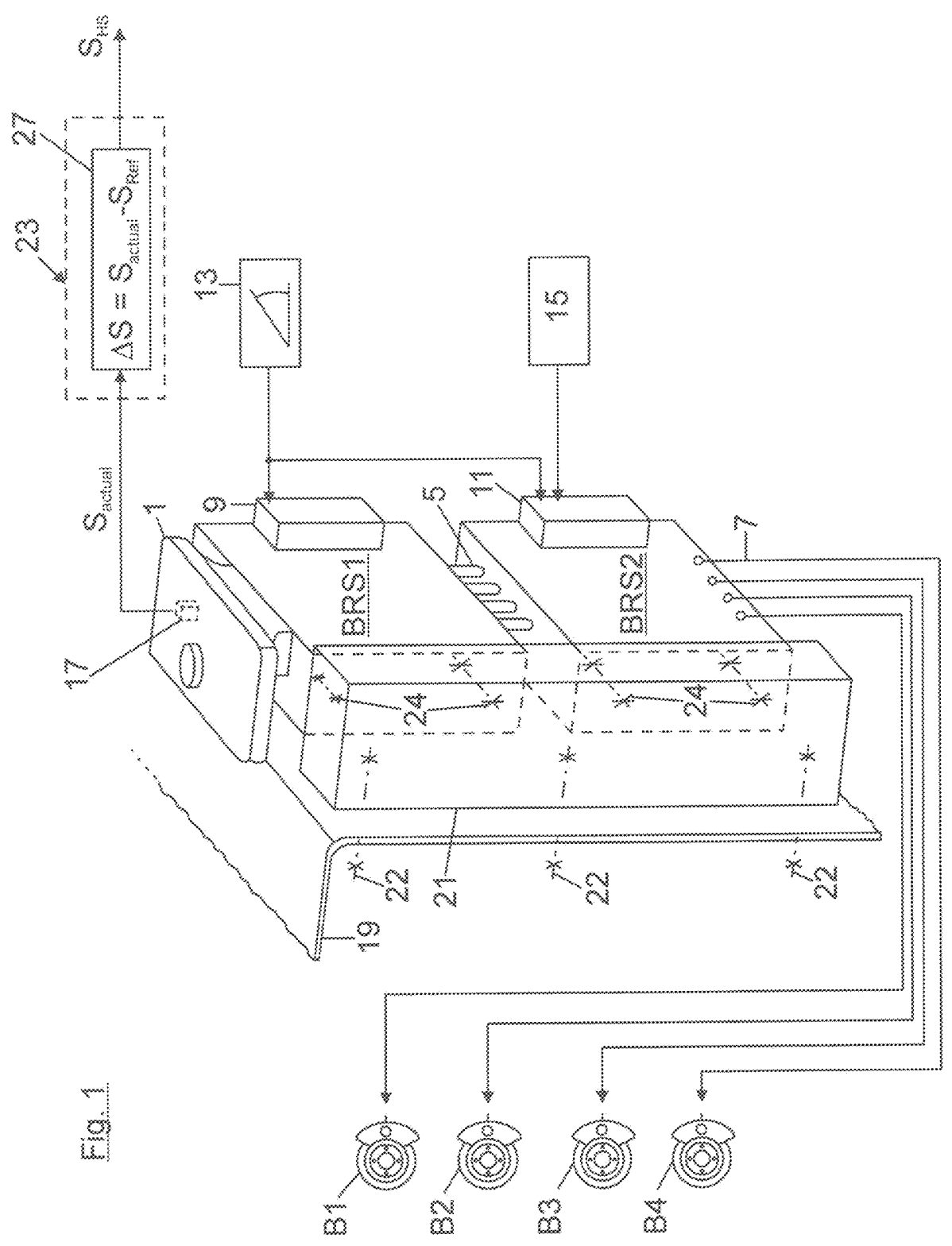
FIG. 1 shows a braking system built into a vehicle according to a first embodiment example.

In FIG. 1, in a schematic diagram, a braking system built into a vehicle is shown to the extent necessary for the understanding of the invention. Said braking system is implemented as a brake-by-wire system and namely with a primary brake control system BRS1 and a secondary brake control system BRS2. Each of the two brake control systems BRS1 and BRS2 comprises a brake pressure regulator, for example, a piston pump or a centrifugal pump. The brake pressure regulator, in case of a braking request, builds up a hydraulic brake pressure by means of which the vehicle wheel brakes B1 to B4 can be actuated. In FIG. 1, a hydraulic fluid container 1 is associated with the two brake control systems BRS1, BRS2. Said hydraulic fluid container is arranged on the upper side of the primary brake control system BRS1 and connected to the two brake control systems BRS1, BRS2. The primary brake control system BRS1 is in connection with the secondary brake control system BRS2 via hydraulic lines 5. Additional hydraulic lines 7 lead from the secondary brake control system BRS2 to the vehicle wheel brakes B1 to B4.

Each of the two brake control systems BRS1 and BRS2 comprises a control device 9, 11. The control devices 9, 11 of the two brake control systems BRS1, BRS2 are in electric signal connection with an electronic brake pedal 13. In addition the control device 11 of the secondary brake control system BRS2 can be electrically actuated by an electronic stability control 15. In case of incorrect operation of the primary brake control system BRS1, the secondary brake control system BRS2 assumes the function of the primary brake control system BRS1.

The two brake control systems BRS1, BRS2 are not attached to the vehicle body 19 directly but rather with the insertion of a separate holder 21 to which the two brake control systems BRS1, BRS2 are attached. The holder 21 is connected to the vehicle body 19 via screw connections 22, while the two brake control systems BRS1, BRS2 are mounted via screw connections 24 on the holder 19.

In FIG. 1, for the detection of a holder failure, an evaluation unit 23 is provided, which is in signal connection with a brake-control-system-internal sensor 17. The internal sensor 17 in FIG. 1 is a filling level sensor. Its main function consists in monitoring the filling level of the hydraulic fluid in the hydraulic fluid container 1. By evaluation of a sensor signal curve $S_{actual}$ of the internal sensor 17, the evaluation unit 23 detects a holder failure. For this purpose, in the evaluation unit 23, a reference signal curve 25, a sensor signal curve of the internal sensor 17 which appears during normal driving operation as well as in case of intact holder 21, is stored. In a comparator component 27 of the evaluation unit 23, a signal comparison occurs, wherein the acquired sensor signal curve $S_{actual}$ is compared to the reference signal curve $S_{Ref}$ stored in the evaluation unit 23.

Figure 2:
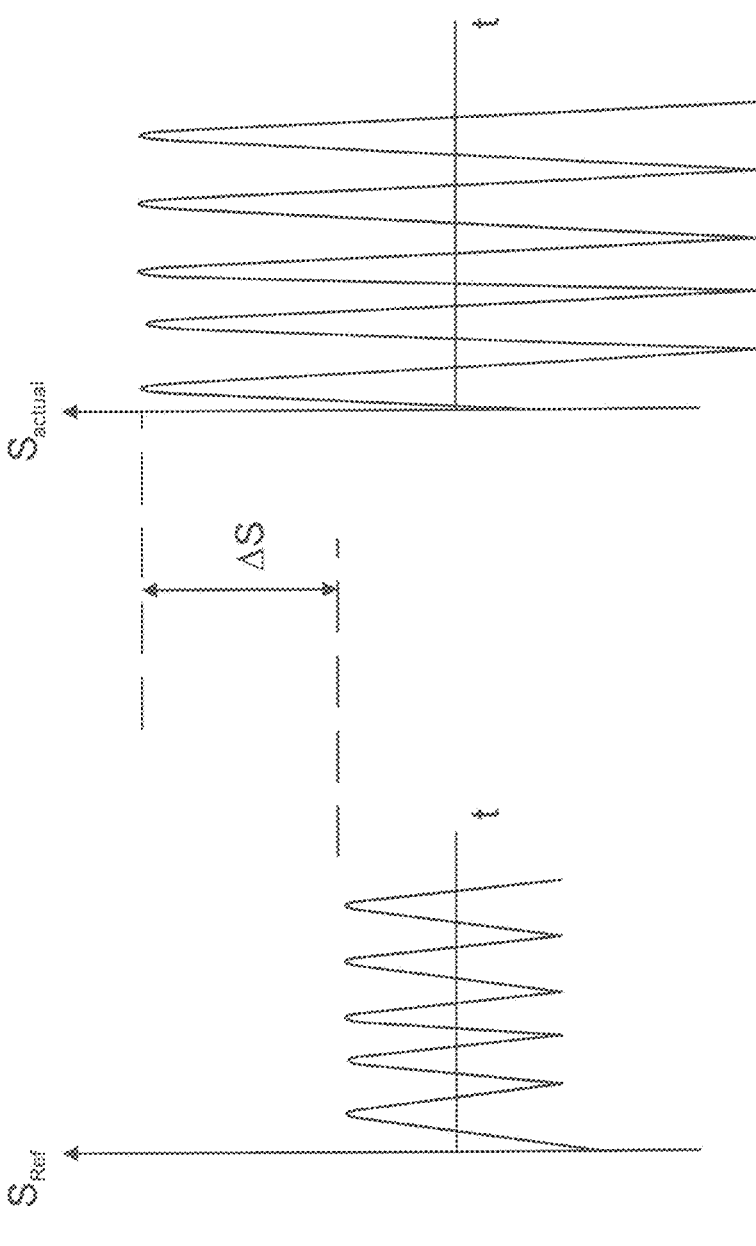
FIG. 2 shows signal curves of an internal sensor of the braking system.

In FIG. 2, in the left time diagram, as an example, the reference signal curve $S_{Ref}$ which appears during normal driving operation in case of intact holder 21 is shown. In the right time diagram, the current sensor signal curve $S_{actual}$ of the internal sensor 17 is shown. The two signal curves $S_{Ref}$ and $S_{actual}$ are shown in FIG. 2 for the sake of simplicity in each case as continuous sine wave. In fact, the two signal curves $S_{Ref}$ and $S_{actual}$ consist of a plurality of mutually superposed sine waves, having different frequencies and amplitudes. In the comparison of the two signal curves $S_{Ref}$ and $S_{actual}$ in FIG. 2, a significant deviation AS can be seen, which appears, for example, in case of a holder break or loose screw connections 22, 24. In case of the presence of such a significant deviation $\Delta S$, the evaluation unit 23 generates a holder damage signal $S_{HS}$, by means of which the client or the factory is informed, for example, via a warning light, a notification text or an entry in the service memory.

Figure 3:
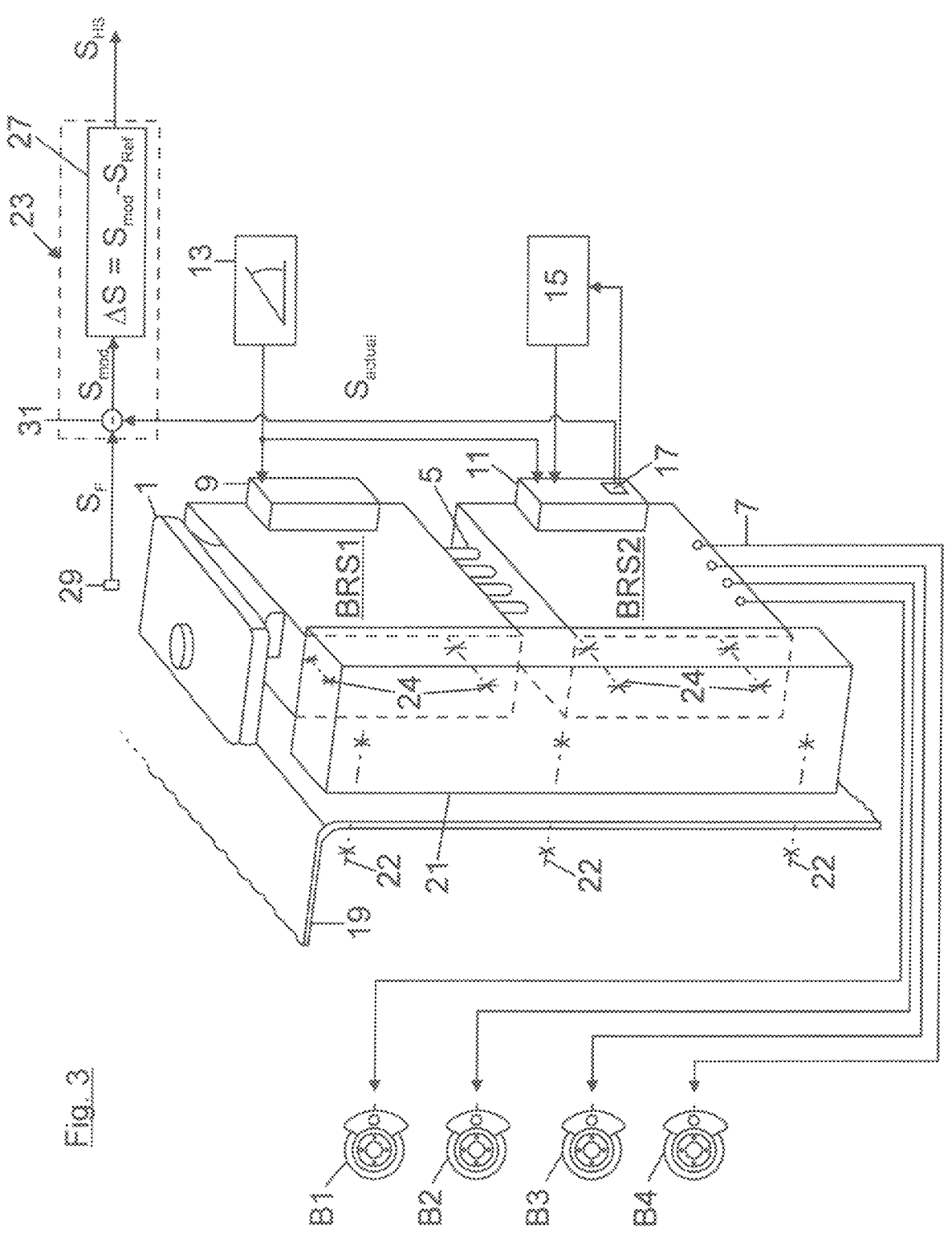
FIG. 3 is a view in accordance with FIG. 1 according to another embodiment example.

In FIG. 3, a second embodiment example is shown, the basic construction and operating mode of which substantially correspond to the construction and operating mode of the preceding embodiment example. In contrast to FIG. 1, the braking system in FIG. 3 comprises, as internal sensor 17, an acceleration sensor which is built into control device 11 of the secondary braking system BRS2. The acceleration sensor is in signal connection with both the evaluation unit 23 and the electronic stability control 15. On the basis of the transverse and/or longitudinal accelerations acquired by the acceleration sensor, the electronic stability control 15 controls the secondary brake control system BRS2 in order to perform vehicle dynamic braking engagements. In the embodiment example of FIG. 3, the evaluation unit 23 detects a holder failure on the basis of the transverse and/or longitudinal accelerations acquired by the acceleration sensor 17.

With a view to a reliable detection of such a holder failure, the evaluation unit 23 in FIG. 3 is additionally in signal connection with an external sensor 29, preferably an acceleration sensor, which is not built into the brake control system BRS1, BRS2. Said sensor acquires vehicle vibrations during driving operation. Induced by the vehicle vibrations, the external sensor 29 generates a vehicle vibration signal SF. In FIG. 3, the evaluation unit 23 comprises a subtraction element 31. Before the performance of the signal comparison in the comparator component 27, the vehicle vibration signal SF is subtracted from the sensor signal curve $S_{actual}$ of the internal sensor 17, whereby a modified sensor signal curve $S_{mod}$ is obtained. Said modified sensor signal curve is cleaned of the vibration component caused by vehicle vibrations. The modified sensor signal curve $S_{mod}$ is supplied to the comparator component 27. There, as in FIG. 1, a signal comparison occurs. In case of a significantly greater deviation $\Delta S$, the holder damage signal $S_{HS}$ is generated. Due to the cleaned modified sensor signal curve $S_{mod}$, an incorrect generation of the holder damage signal $S_{HS}$ arising due to an excessively high vehicle vibration is prevented.

The external sensor 29 can be built into various other components of the vehicle, for example, into an airbag control device. For example, the external sensor 29 can be a 3D, longitudinal or transverse acceleration sensor or else a filling level sensor.

Figure 4:
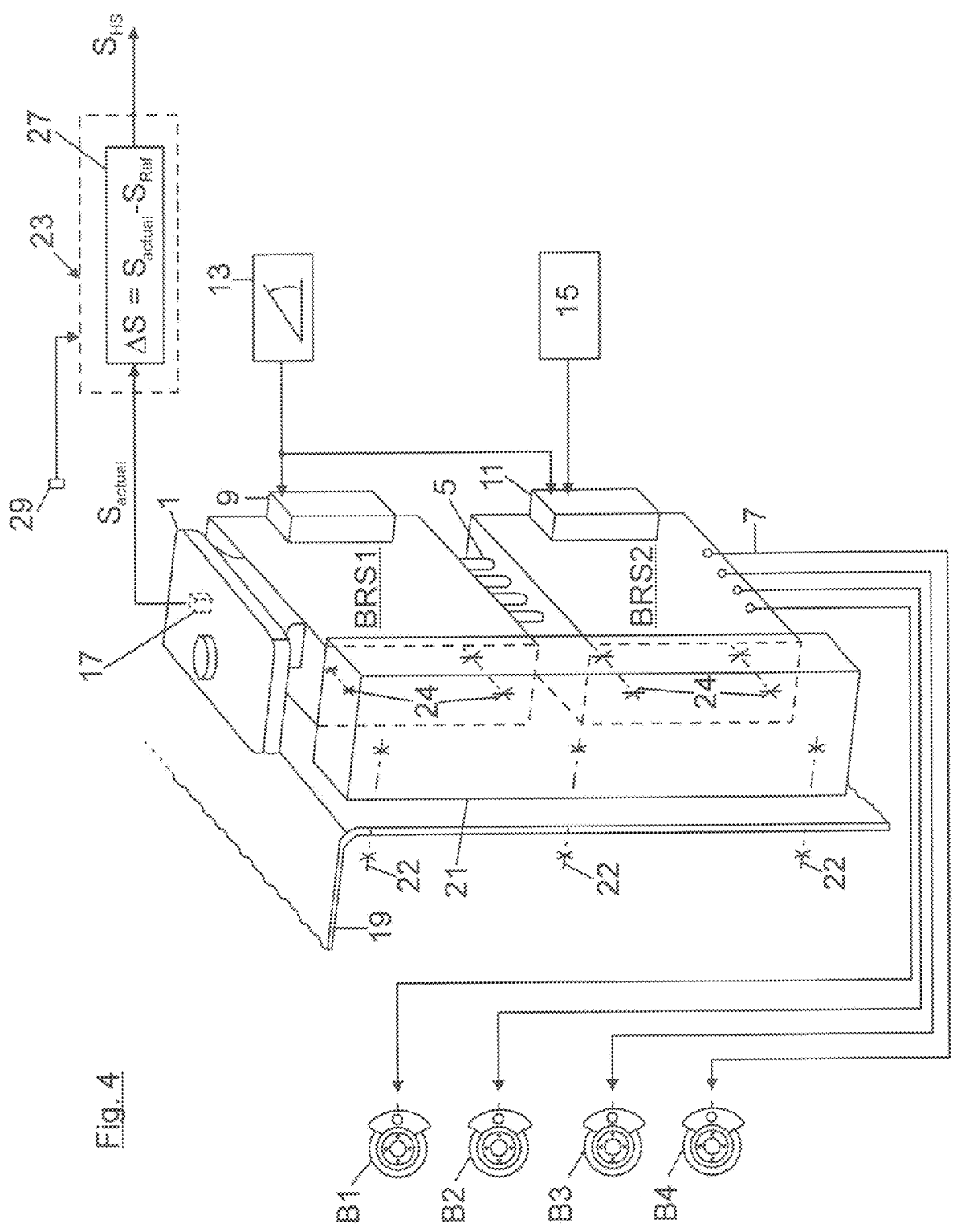
FIG. 4 is a view in accordance with FIG. 1 according to another embodiment example.

In FIG. 4, an alternative embodiment example is indicated, by means of which an incorrect generation (due to excessively high vehicle vibration) of a holder damage signal $S_{HS}$ can also be prevented. The embodiment example of FIG. 4 substantially corresponds to the embodiment example of FIG. 1. In contrast to FIG. 1, in FIG. 4, the comparator component 27 starts a signal comparison only if the vehicle vibration acquired by the external acceleration sensor 29 is below a limit value. In this way, an incorrect generation of a holder damage signal $S_{HS}$ caused by excessively high vehicle vibrations, for example, in case of rough road, can be prevented.

Figure 5:
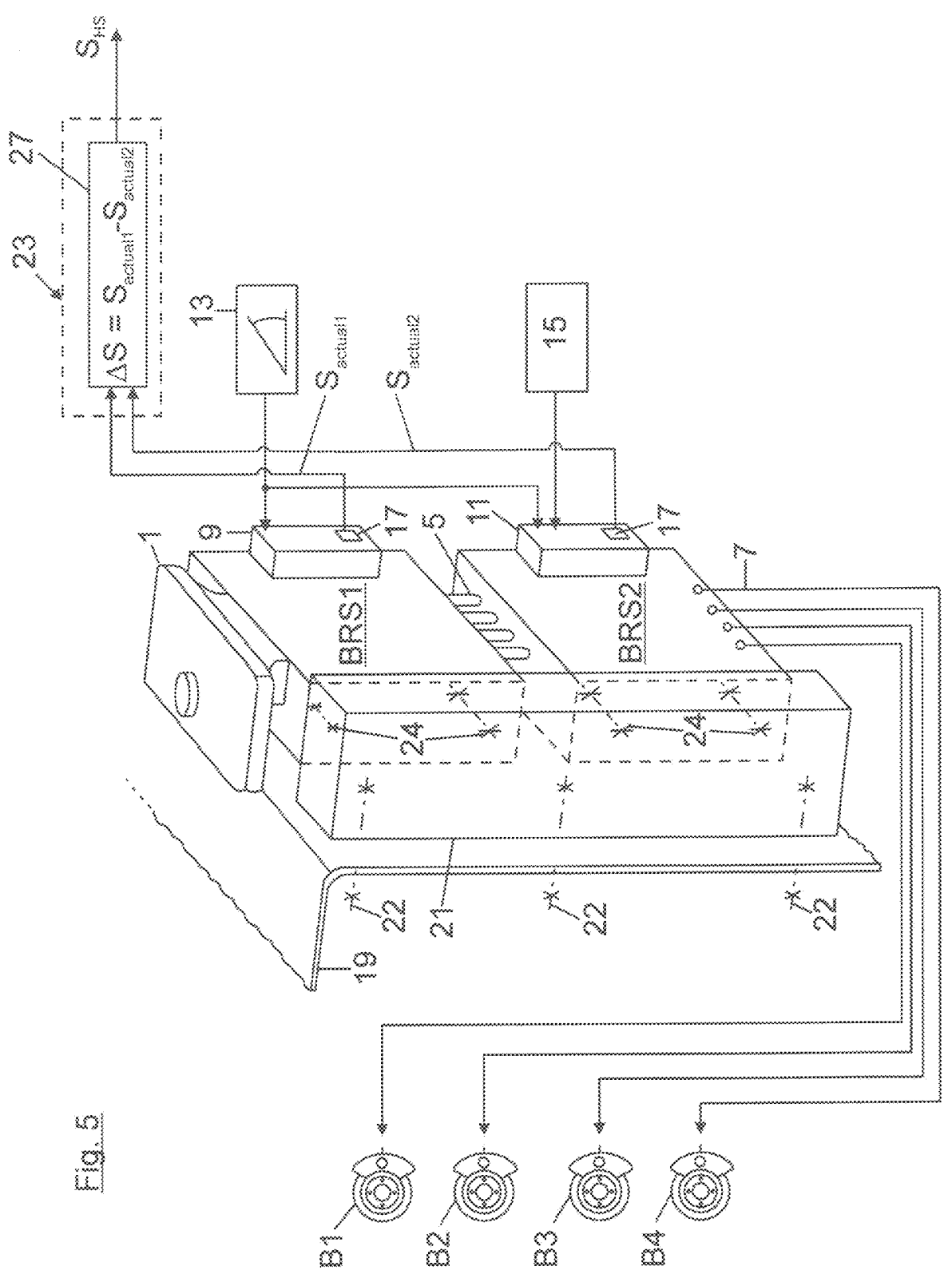
FIG. 5 is a view in accordance with FIG. 1 according to another embodiment example.

In the embodiment example of FIG. 5, in each of the control devices 9, 11 of the brake control systems BRS1, BRS2 a respective internal sensor 17 is built in as accelerator sensor. In this case, the sensor signal curves $S_{actual1}$, $S_{actual2}$ of the two internal sensors 17 are compared to one another in the comparator component 27 of the evaluation unit 23. Thus, no reference signal curve is stored in the evaluation unit 23 as in the first embodiment example. Instead, the sensor signal curve $S_{actual1}$ of one internal sensor 17 forms the reference signal curve for the sensor signal curve $S_{actual2}$ of the other internal sensor 17. In case of a significant deviation $\Delta S$ between the two sensor signal curves $S_{actual1}$, $S_{actual2}$, the evaluation unit 23 generates the holder damage signal $S_{HS}$.

In the embodiment example of FIG. 6, a method 100 for detecting a holder failure in a braking system is disclosed. At a first step 102, a sensor signal curve $S_{actual}$ is acquired from the internal sensor 17. At step 104, the acquired sensor curve $S_{actual}$ is compared to the reference signal curve $S_{Ref}$. At step 103, if the deviation $\Delta S$ of the acquired signal curve $S_{actual}$ from the reference signal curve $S_{Ref}$ is significant, a holder damage signal Sus is generated.

LIST OF REFERENCE NUMERALS

1 Hydraulic fluid container
5 Hydraulic line
7 Hydraulic line
9, 11 Control device
13 Electronic brake pedal
15 Electronic stability control
17 Internal sensor
19 Vehicle body
22 Screw connections
23 Evaluation unit 24 Screw connections
25 Reference
27 Comparator component
29 External sensor
31 Subtraction element
BRS1 Primary brake control system
BRS2 Secondary brake control system
B1 to B4 Vehicle wheel brakes
$S_{actual}$ Sensor signal curve
$S_{Ref}$ Reference signal curve
$\Delta S$ Deviation
$S_{mod}$ Modified sensor signal curve
$S_F$ Vehicle vibration signal
$S_{HS}$ Holder damage signal

The invention claimed is:

1. A braking system of a vehicle, comprising:
at least one brake control system with a brake pressure regulator which, in case of a braking request, builds up a hydraulic brake pressure by which wheel brakes of the vehicle can be actuated, wherein the brake control system is attached to a body of the vehicle via a holder;
wherein, for detection of a holder failure, an evaluation unit is provided, which acquires a sensor signal curve from an internal sensor built into the brake control system;
wherein, in the evaluation unit, a signal comparison occurs, wherein the acquired sensor signal curve is compared to a reference signal curve, and wherein, in case of a significant deviation of the acquired sensor signal curve from the reference signal curve, the evaluation unit generates a holder damage signal.

2. The braking system according to claim 1, wherein the internal sensor built into the brake control system is a filling level sensor of a hydraulic fluid container of the brake control system.

3. The braking system according to claim 1, wherein the internal sensor built into the brake control system is an acceleration sensor, on the basis of which an electronic stability control actuates the brake control system, in order to perform braking engagements.

4. The braking system according to claim 1, wherein:
the braking system is implemented as a brake-by-wire system;;
the brake control system forms a primary brake control system and, additionally, a secondary brake control system is provided, which, in case of an incorrect operation of the primary brake control system assumes the function of the primary brake control system; and
the two brake control systems together are attached to the holder.

5. The braking system according to claim 1, wherein;
the evaluation unit is additionally in signal connection with an external sensor not built into the brake control system, which external sensor, in case of vehicle vibrations during driving operation, generates a corresponding vehicle vibration signal;
before the performance of the signal comparison, the evaluation unit subtracts the vehicle vibration signal from the sensor signal curve acquired from the internal sensor, so as to form a modified sensor signal curve which is cleaned of a vibration component attributed to the vehicle vibrations; and
the signal comparison is performed with the modified sensor signal curve as the acquired sensor signal curve.

6. The braking system according to claim 5, wherein the evaluation unit checks for a presence of holder failure only if the vehicle vibrations acquired by the external sensor are below a limit value, so that an incorrect generation of the holder damage signal due to vehicle vibrations above the limit value is prevented.

7. The braking system according to claim 1, wherein the reference signal curve is a signal curve of the internal sensor which appears during normal driving operation as well as in case of the holder being intact.

8. The braking system according to claim 4, wherein:

a second internal sensor is built in the secondary brake control system; and the sensor signal curve of the internal sensor is compared, in the evaluation unit, to a sensor signal curve acquired from the second internal sensor, so that the sensor signal curve of one internal sensor forms the reference signal curve for the sensor signal curve of the other internal sensor.

9. A method for detecting a holder failure in a braking system according to claim 1, the method being executable by the evaluation unit and comprising the steps of:

acquiring the sensor signal curve from the internal sensor;

comparing the acquired sensor signal curve to the reference signal curve; and generating the holder damage signal in case of significant deviation of the acquired sensor signal curve from the reference signal curve.

10. The braking system according to claim 2, wherein:

the braking system is implemented as a brake-by-wire system;

the brake control system forms a primary brake control system and, additionally, a secondary brake control system is provided, which, in case of an incorrect operation of the primary brake control system assumes the function of the primary brake control system; and the two brake control systems together are attached to the holder.

11. The braking system according to claim 3, wherein:

the braking system is implemented as a brake-by-wire system;

the brake control system forms a primary brake control system and, additionally, a secondary brake control system is provided, which, in case of an incorrect operation of the primary brake control system assumes the function of the primary brake control system; and the two brake control systems together are attached to the holder.

12. The braking system according to claim 2, wherein:

the evaluation unit is additionally in signal connection with an external sensor not built into the brake control system, which external sensor, in case of vehicle vibrations during driving operation, generates a corresponding vehicle vibration signal;

before the performance of the signal comparison, the evaluation unit subtracts the vehicle vibration signal from the sensor signal curve of acquired from the internal sensor, so as to form a modified sensor signal curve which is cleaned of a vibration component attributed to the vehicle vibrations; and the signal comparison is performed with the modified sensor signal curve as the acquired sensor signal curve.

13. The braking system according to claim 3, wherein:

the evaluation unit is additionally in signal connection with an external sensor not built into the brake control system, which external sensor, in case of vehicle vibrations during driving operation, generates a corresponding vehicle vibration signal;

before the performance of the signal comparison, the evaluation unit subtracts the vehicle vibration signal from the sensor signal curve acquired from the internal sensor, so as to form a modified sensor signal curve which is cleaned of a vibration component attributed to the vehicle vibrations; and the signal comparison is performed with the modified sensor signal curve as the acquired sensor signal curve.

14. The braking system according to claim 4, wherein;

the evaluation unit is additionally in signal connection with an external sensor not built into the brake control system, which external sensor, in case of vehicle vibrations during driving operation, generates a corresponding vehicle vibration signal;

before the performance of the signal comparison, the evaluation unit subtracts the vehicle vibration signal from the sensor signal curve acquired from the internal sensor, so as to form a modified sensor signal curve which is cleaned of a vibration component attributed to the vehicle vibrations; and the signal comparison is performed with the modified sensor signal curve as the acquired sensor signal curve.

15. The braking system according to claim 2, wherein the reference signal curve is a signal curve of the internal sensor which appears during normal driving operation as well as in case of the holder being intact.

16. The braking system according to claim 3, wherein the reference signal curve is a signal curve of the internal sensor which appears during normal driving operation as well as in case of the holder being intact.

17. The braking system according to claim 4, wherein the reference signal curve is a signal curve of the internal sensor which appears during normal driving operation as well as in case of the holder being intact.

18. The braking system according to claim 5, wherein the reference signal curve is a signal curve of the internal sensor which appears during normal driving operation as well as in case of the holder being intact.

19. The braking system according to claim 6, wherein the reference signal curve is a signal curve of the internal sensor which appears during normal driving operation as well as in case of the holder being intact.

* * * * *